United States Patent
Mossoba et al.

(10) Patent No.: US 10,477,021 B1
(45) Date of Patent: Nov. 12, 2019

(54) SYSTEMS FOR DETECTING HARASSING COMMUNICATION

(71) Applicant: Capital One Services, LLC, McLean, VA (US)

(72) Inventors: Michael Mossoba, Arlington, VA (US); Abdelkader Benkreira, Washington, DC (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/204,477

(22) Filed: Nov. 29, 2018

(51) Int. Cl.
*H04M 3/51* (2006.01)
*H04M 3/523* (2006.01)
*H04M 3/42* (2006.01)
*G10L 15/22* (2006.01)
*G10L 15/18* (2013.01)
*G06Q 30/00* (2012.01)

(52) U.S. Cl.
CPC ........ *H04M 3/5175* (2013.01); *G06Q 30/016* (2013.01); *G10L 15/1815* (2013.01); *G10L 15/22* (2013.01); *H04M 3/42059* (2013.01); *H04M 3/42102* (2013.01); *H04M 3/5183* (2013.01); *H04M 2201/40* (2013.01); *H04M 2201/41* (2013.01)

(58) Field of Classification Search
None
See application file for complete search history.

(56) References Cited

U.S. PATENT DOCUMENTS

| 6,411,687 B1* | 6/2002 | Bohacek | H04M 3/51 379/201.11 |
| 7,496,628 B2 | 2/2009 | Arnold | |
| 9,614,974 B1* | 4/2017 | Hodge | H04M 7/0078 |
| 10,003,688 B1* | 6/2018 | Walters | G10L 25/51 |
| 2014/0250196 A1* | 9/2014 | Joao | G06F 16/951 709/206 |
| 2015/0092930 A1* | 4/2015 | Mullen | H04M 3/4936 379/88.01 |
| 2015/0154527 A1 | 6/2015 | Gill | |
| 2016/0140965 A1* | 5/2016 | Kumar | G10L 15/26 704/9 |
| 2016/0147731 A1 | 5/2016 | Parikh | |
| 2018/0226071 A1* | 8/2018 | Winter | G10L 15/197 |

FOREIGN PATENT DOCUMENTS

CN 105721660 A 6/2016

* cited by examiner

*Primary Examiner* — Harry S Hong
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method for detecting harassment. The system may receive communication data from a first customer service representative terminal or a customer communication device and may determine, based at least in part on the communication data and stored communication data, that the communication data comprises harassing content. The system may, responsive to determining that the communication data comprises harassing content, transmit to a second customer service representative terminal, a notification indicating that the communication data comprises harassing content.

10 Claims, 6 Drawing Sheets

SYSTEMS FOR DETECTING HARASSING COMMUNICATION

FIELD OF INVENTION

The present disclosure relates generally to detecting and/or intervening harassing communication or communication perceived by a recipient to be harassing, such as vulgar, racist, sexist, condescending, or otherwise offensive language, mannerisms, facial expressions, or other forms of communication.

BACKGROUND

Many businesses employ one or more customer service representatives (CSRs) who are responsible for acting as a liaison between customers and the business. CSRs typically communicate with customers to assist with complaints, orders, errors, account questions, billing issues, service cancellations, and other queries. CSRs typically communicate with customers via telephone, email, mail, text messaging (e.g., short message service, multimedia messaging service), instant messaging, video conferencing, social media, or other communication channels. When a CSR communicates with customers, the CSR may be subjected to verbal or nonverbal harassing communication. Alternately or in addition, a CSR may subject a customer to harassing communication, which could create or support a negative public perception of the business.

Typically, when a customer gets upset while communicating with a CSR or when a customer requests to speak with a customer service manager (CSM), the CSR must refer the customer to a CSM. The CSM must then be apprised, by the CSR or the customer, of the nature of the already-transpired conversation. This can cause an already upset customer to become more upset with the CSR, the CSM, and/or the business, which could cause undue anxiety to the customer and/or could create or support a negative public perception of the business.

Further, the customer service industry may experience a relatively high turnover rate with respect to other industries, and the frequency with which CSRs are subjected to harassing communication may correlate with the turnover rate for that position. That is, an increase in the amount, frequency, or severity of harassing communication that a CSR is subjected to may increase the likelihood that the CSR is likely to quit that position. This may cause the business to shift, to other CSRs, the duties formerly assigned to the former CSR, and this increase in workload may cause a decrease in the level of customer service afforded to customers.

Alternately, the business may fill the vacated position with a new hire, which will cause the business to incur the high costs associated with training a new hire.

Accordingly, there is a need for improved devices, systems, and methods that can detect—in real-time or in near real-time—harassing language or other harassing communication. And there is a need for improved devices, systems, and methods that can automatically refer a customer to a CSM upon detection or prediction or harassing communication.

SUMMARY

Disclosed embodiments provide systems and methods for detecting harassing communication. Some disclosed embodiments provide systems and methods for detecting and intervening harassing communication.

Consistent with the disclosed embodiments, the system may include one or more memory devices storing instructions and one or more processors configured to execute the instructions to perform steps of detecting harassment. The system may execute the instructions to receive, from at least one of a first customer service representative (CSR) terminal and a customer communication device, communication data (e.g., voice data), and the communication data may comprise data corresponding to a communication from a user of the first CSR terminal and a user of the customer communication device. The system may execute the instructions to determine, based at least in part on the communication data and stored communication data (e.g., stored linguistics data), that the communication data comprises harassing content, and in response to determining that the communication data comprises harassing content, the system may execute the instructions to transmit, to a second CSR terminal (e.g., a customer service manager (CSM) terminal), a notification indicating that the communication data comprises harassing content.

Consistent with the disclosed embodiments, methods for detecting that a user believes he or she is being subjected to harassing communication are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
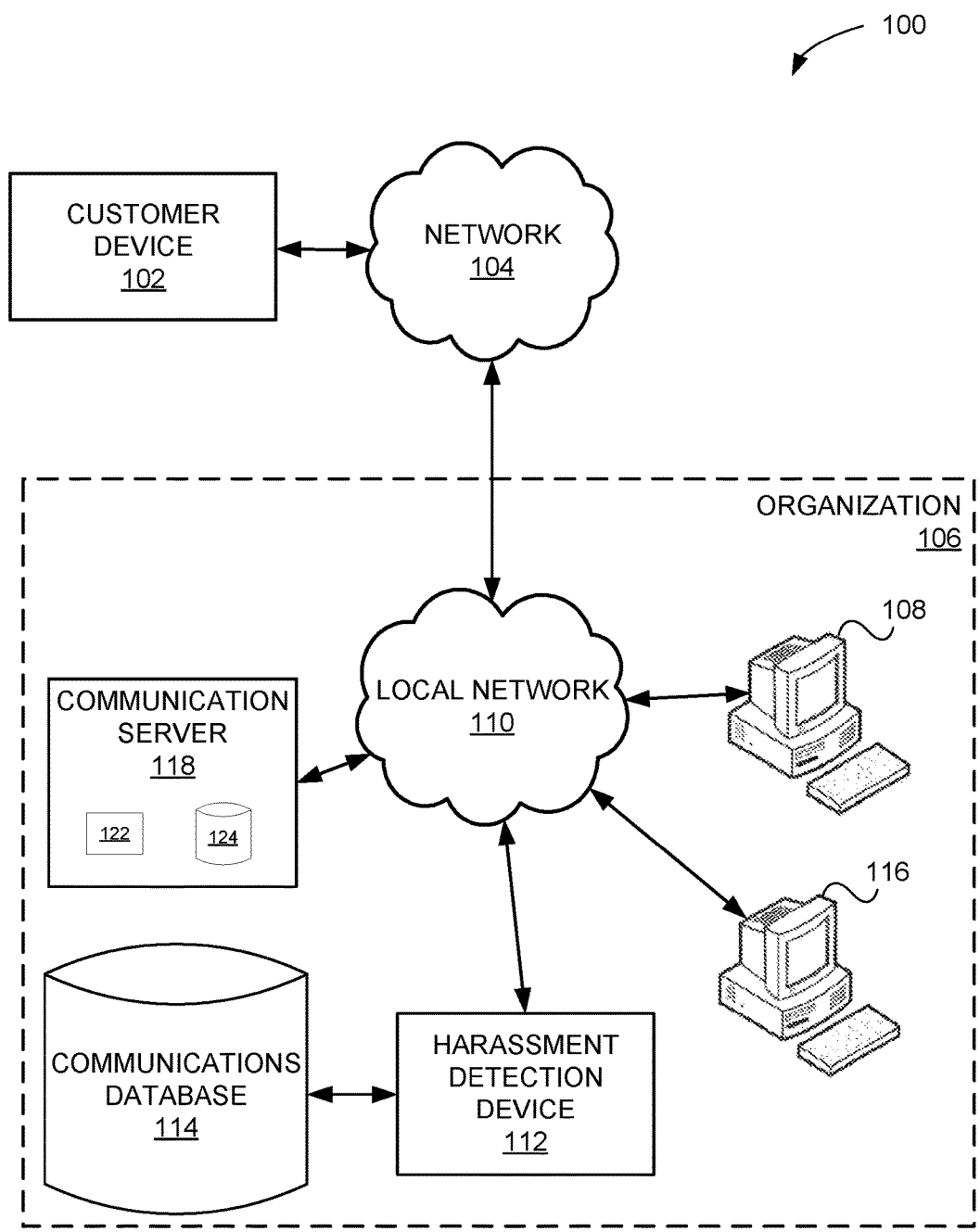
FIG. 1 is a diagram of an example harassment detection system, in accordance with some embodiments.

Throughout this disclosure, certain example embodiments are described in relation to systems and methods for detecting harassing communications. As used herein, harassing communication may refer aggressive, angry, and/or threatening communications. But embodiments of the disclosed technology are not so limited. In some embodiments, the disclosed technology may be effective in detecting that a user perceives he or she is being subjected or exposed to harassing communication. Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for detecting harassing communication. In some embodiments, the system may include one or more memory devices storing instructions and one or more processors configured to execute the instructions to perform steps of a method. Specifically, in some embodiments, the system may execute the instructions to receive, from one or more environmental sensors, communication data. The environmental sensors may be a part of the system. Alternately or in addition, the environmental sensor(s) may be separate from the system, and the system may receive data from the environmental sensor(s). The communication data may include voice data, which may include semantics data, syntax data, intonation data, volume data, stutter data, and/or non-word utterances data. The communication data may comprise mannerism data, facial express data, and/or behavioral biometric data. The system may detect and/or measure one or more types of communication data as baseline communication data for one or more users and may store the baseline communication data via memory associated with the one or more processors. The baseline communication data may comprise data indicative of the user conveying harassing communication, data indicative of the user conveying non-harassing communication, data indicative of the user being subjected to harassing communication, and/or data indicative of the user being subjected to non-harassing communication. The system may compare, by the one or more processors, the communication data received from the sensor(s) to the baseline communication data, and based on the comparison, the system may determine a level of similarity of the received communication data to the baseline communication data. The system may determine that the level of similarity is above a predetermined level of similarity such that the system may determine that the received communication data comprises harassing content or likely comprises harassing content, and the system may transmit, to a second CSR terminal, a notification indicating that the voice data comprises harassing content.

In some embodiments, a system for detecting harassing communication may include a non-transitory computer-readable medium storing instructions that, when executed by one or more processors, cause a system to perform steps of a method. Specifically, in some embodiments, the one or more processors may execute the instructions to receive CSR communication data form a first CSR terminal and customer communication data from a customer communication device. The first CSR communication data can include data corresponding to communication from a user of the first CSR terminal, and the customer voice data comprising data corresponding to oral communication from a user of the customer communication device. The system can execute the instructions to determine a CSR identity of the user of the first CSR terminal and can save received CSR communication data in a memory location associated with the user of the first CSR terminal. The system can execute the instructions to determine a customer identity of the user of the customer communication device and can save received customer communication data in a memory location associated with the user of the customer communication device. The system can execute instructions to determine, based at least in part on a comparison of stored historical communication data to at least one of the received CSR communication data and the received customer communication data, that the CSR communication data and/or customer communication data comprises harassing content. The historical communication data may comprise historical CSR communication data and/or historical customer communication data. The system may execute instructions to transmit, to a second CSR terminal, a notification indicating that the CSR communication data and/or customer communication data comprises harassing content.

In some embodiments, a method for detecting harassing communication is disclosed. The method may include receiving customer communication data from a customer communication device. The communication data may comprise data corresponding to spoken communication from a user of the customer communication device. The method may include determining, based at least in part on the customer communication data and stored historical communication data, that the customer communication data is indicative of the user of the customer communication device perceiving that a user of a first CSR terminal is being unfair or otherwise in violation of the Dodd-Frank Wall Street Reform and Consumer Protection Act ("Dodd-Frank") (Pub. L. 111-203, 124 Stat. 1376-2223), which prohibits certain service providers from committing unfair, deceptive, or abusive acts or practices. (As used herein, "being treated unfairly" may refer to violations of Dodd-Frank or other deceptive or prohibited conduct.) The method may include transmitting, to a second CSR terminal, a notification indicating that the user of the customer communication device perceives that the user of the first CSR terminal is being unfair.

Although the above embodiments are described with respect to a system, a non-transitory computer-readable medium, and a method, it is contemplated that embodiments with identical or substantially similar features may alternatively be implemented as methods, systems, and/or non-transitory computer-readable media.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system 100 that may be configured to perform one or more processes that may detect harassing communication. The components and arrangements shown in FIG. 1 are not intended to limit the disclosed embodiments as the components used to implement the disclosed processes and features may vary. As shown, system 100 may include a third-party communication device (e.g., customer communication device, customer device) 102, which may be connected to an organization 106 via a network 104. Organization 106 may include, for example, a first CSR terminal 108, a harassment detection device 112, a communications database 114, a second CSR (e.g., CSM) terminal 116, and a communication server 120, which may include one or more processors 122 and one or more memory devices 124. Some or all of the various devices and/or components of organization 106 may be connected by a local network 110, and local network may be connected to network 104. In some embodiments, one, some, or all of the various devices and/or components of organization 106 may be in direct communication with customer device 102, such as by an RF radio. Although certain devices and/or components are shown as being separate in FIG. 1, it should be understood that in some embodiments, some or all of the elements of organization 106 may be combined together into a single device and/or into one or more components.

According to some embodiments, organization 106 may be associated with an entity such as a business, corporation, individual, partnership, or any other entity. In certain embodiments, organization 106 may be associated with any entity that may provide financial services or processing of financial transactions such as a bank, a credit card company, or the like. According to some embodiments, organization 106 may be associated with an entity that provides goods and services.

In some embodiments, a customer may operate a customer device 102. Customer device 102 can be one or more of a mobile device, smart phone, general purpose computer, tablet computer, laptop computer, telephone, a public switched telephone network (PSTN) landline, smart wearable device, voice command device, other mobile computing device, or any other device capable of communicating with network 104 and/or one or more components of organization 106. In certain embodiments, a CSR may operate first CSR terminal 108. First CSR terminal 108 may be or include one or more of a mobile device, smart phone, general purpose computer, tablet computer, laptop computer, telephone, a public switched telephone network (PSTN) landline, smart wearable device, voice command device, other mobile computing device, or any other device capable of communicating with local network 110, network 104, customer device 102, and/or one or more components of organization 106. According to some embodiments, some or all of the components and/or functionalities of customer device 102 may be included in first CSR terminal 108, and in some embodiments, some or all of the components and/or functionalities of first CSR terminal 108 may be included in customer device 102. Customer device 102 may belong to or be provided by the customer, or may be borrowed, rented, or shared. Users of customer device 102 may include individuals such as, for example, subscribers, clients, prospective clients, or customers of an entity associated with organization 106 and/or a third party, such as a third party associated with organization 106. According to some embodiments and as described more fully below, customer device 102 and/or user computing device 104 may include one or more of: an environmental sensor for obtaining audio or visual data (e.g., a microphone and/or digital camera), an input/output device such as a transceiver for sending and receiving data (e.g., via Wi-Fi, cellular communications, near-field communications (NFC), Bluetooth™, and the like), a display for displaying digital images, one or more processors, and/or a memory in communication with the one or more processors. In some embodiments, customer device 102 may include a display and/or a speaker.

Figure 2:
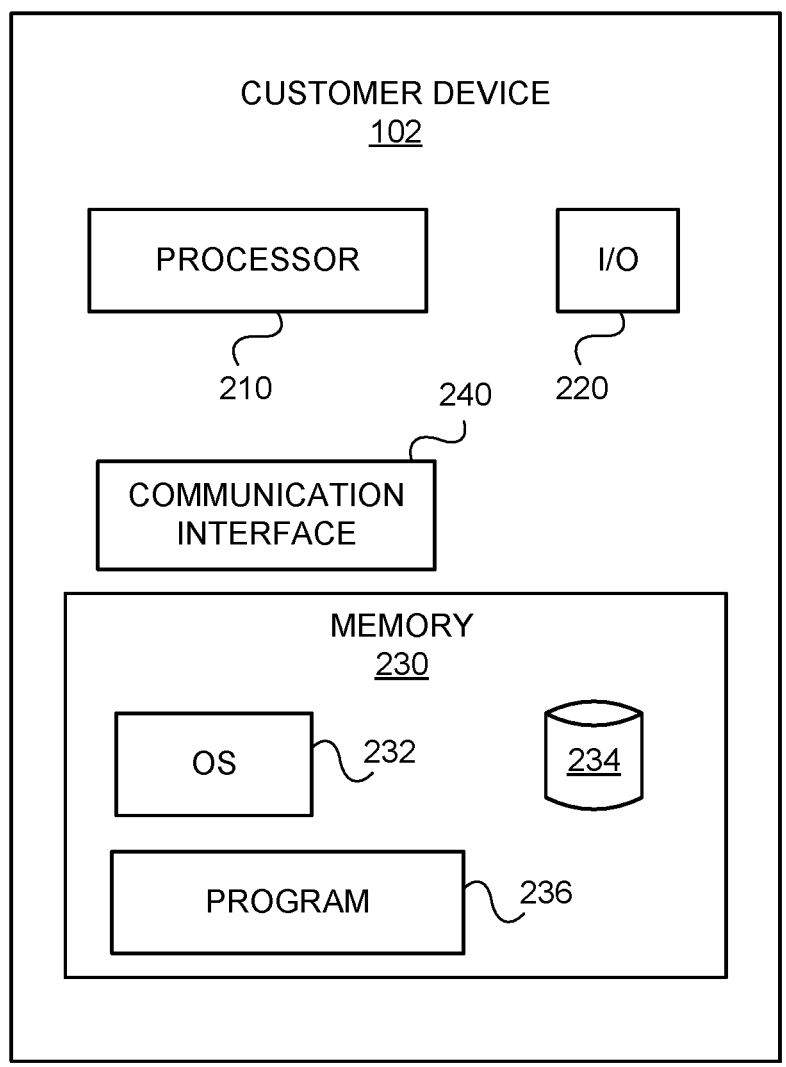
FIG. 2 is a component diagram of an example third-party communication device, in accordance with some embodiments.

An example embodiment of customer device 102 is shown in more detail in FIG. 2. Customer device 102 may have a similar structure and components that are similar to those described with respect to first CSR 108. As shown, customer device 102 may include a processor 210; an input/output (I/O) device 220; a memory 230, which may contain an operating system (OS) 232, a storage device 234, which may be any suitable repository of data, and a program 236; and a communication interface 240. In some embodiments, communication interface 240 may include a transceiver. In certain embodiments, customer device 102 may include a user interface (U/I) device for receiving user input data, such as data representative of a click, a scroll, a tap, a press, a spatial gesture (e.g., as detected by one or more accelerometers and/or gyroscopes), or typing on an input device that can detect tactile inputs. In some embodiments, customer device 102 may include a microphone and/or an image capture device, such as a digital camera.

In some embodiments, customer device 102 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public. A power source may be configured to provide an appropriate alternating current (AC) or direct current (DC) to power components.

As described above, customer device 102 may be configured to remotely communicate with one or more other devices, such as first CSR terminal 108, second CSR terminal 116, harassment detection device 112, and/or any other component of organization 106. In some embodiments, wearable user device 102 may be configured to communication with one or more devices via network 104 and/or via network 110. According to some embodiments, customer device 102 may be configured to detect and transmit communication data. In certain embodiments, customer device 102 may be configured to receive and output communication data, such as by a display and/or speaker.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and or other applications, as necessary), executable instructions and data. In some embodiments, processor 210 may include a secure microcontroller, which may be configured to transmit and/or facilitate secure lines of communication. In some embodiments, some or all of the processing techniques described herein can be implemented as a combination of executable instructions and data within memory 230.

Processor 210 may be one or more known processing devices, such as a microprocessor from the Pentium™ family manufactured by Intel™, the Turion™ family manufactured by AMD™, or the Cortex™ family or SecurCore™ manufactured by ARM™. Processor 210 may constitute a single-core or multiple-core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Customer device 102 may include one or more storage devices 234 configured to store information used by processor 210 (or other components) to perform certain functions related to the disclosed embodiments. As an example, customer device 102 may include memory 230 that includes instructions to enable processor 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, customer device 102 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks.

According to some embodiments, program(s) 236 may be configured to detect and/or obtain customer baseline communication data associated with a user of customer device 102. In some embodiments, the customer baseline communication data may include data indicative of the user conveying harassing communication. In some embodiments, the customer baseline communication data may include data indicative of the user conveying non-harassing communication. In some embodiments, the customer baseline communication data may include data indicative of the user being subjected to harassing communication. In some embodiments, the customer baseline communication data may include data indicative of the user being subjected to non-harassing communication.

In some embodiments, the customer baseline communication data may include different types of communication data. For example, the customer baseline communication data may include communication data including, but not limited to, voice data, which may include semantics data, syntax data, intonation data, volume data, stutter data, and/or non-word utterances data. In some embodiments, the communication data may comprise mannerism data, facial express data, and/or behavioral biometric data. In certain embodiments, program(s) 236 may be configured to provide a request (e.g., audibly or via a display associated with customer device 102) for a user to provide customer baseline communication data. In some embodiments, program(s) 236 may be configured to detect that a user is communicating and may measure and/or record the communication. In some embodiments, program(s) 236 may be configured to record and/or measure only those communications approved to be recorded by the user. In some embodiments, program(s) 236 may be configured to record and/or measure all communications by the user. In some embodiments, program(s) 236 may be configured to determine that the person communicating is the user prior to recording and/or measuring communication data. In certain embodiments, program(s) 236 may be configured to record and/or measure only those communications with organization 106, such as communications with first CSR terminal 108. In some embodiments, program(s) 236 may be configured to request confirmation from the user indicating whether the received communication data is indicative of harassing communication, non-harassing communication and/or whether the user is being subjected to harassing or non-harassing communication. In certain embodiments, program(s) 236 may be configured to store customer baseline communication data locally, such as at storage device 234, or remotely, such as at communications database 114 of organization 106. In embodiments in which customer baseline communication data is stored remotely, program(s) 236 may be configured to transmit received customer baseline communication data to organization 106 (e.g., communications database 114) on a continuous, regular, semi-regular, and/or predetermined basis or in response to one or more triggers, such as receiving manual input instructing the received customer baseline communication data to be transmitted. In some embodiments, program(s) 236 may be configured to transmit received customer baseline communication data as it is received. As will be discussed more fully below, all received communication data—including data received during a conversation between a user of customer device 102 and a user of first CSR terminal 108—can be ultimately added to the customer baseline communication data, which may improve the accuracy and/or fidelity of the customer baseline communication data.

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a customer baseline communication database including data enabling customer device 102 to perform one or more of the processes and functionalities associated with the disclosed embodiments. The customer baseline communication database may include data corresponding to one or more types of communication data as discussed herein. In some embodiments, the customer baseline communication database may include default communication data that may be representative information that is typically representative of a person conveying harassing communication, conveying non-harassing communication, being subjected to harassing communication, and/or being subjected to non-harassing communication. While the use of default communication data may permit customer device 102 to perform various operations and functionalities without requiring the user to provide customer baseline communication data, detections of harassing communication that are based on the default communication data may not be as accurate as detections that are based on customer baseline communication data specific to an individual user as communicative tendencies and/or biological responses to stress (and its effect on an individual's communication) may vary from person to person.

Customer device 102 may also be communicatively connected to one or more memory devices (e.g., databases (not shown)) locally or through a network. The remote memory devices may be configured to store information and may be accessed and/or managed by customer device 102. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, customer device 102 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While customer device 102 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the customer device 102 may include a greater or lesser number of components than those illustrated. Some embodiments may exclude certain components discussed herein. For example, in certain embodiments, customer device 102 may not include an OS, depending on the complexity of the program instructions. Embodiments not including an OS may have comparative limited functionality but may also decrease power consumption of customer device 102. The various components of customer device 102 may include the same or similar attributes or capabilities of the same or similar components discussed with respect to first CSR terminal 108.

Figure 3:
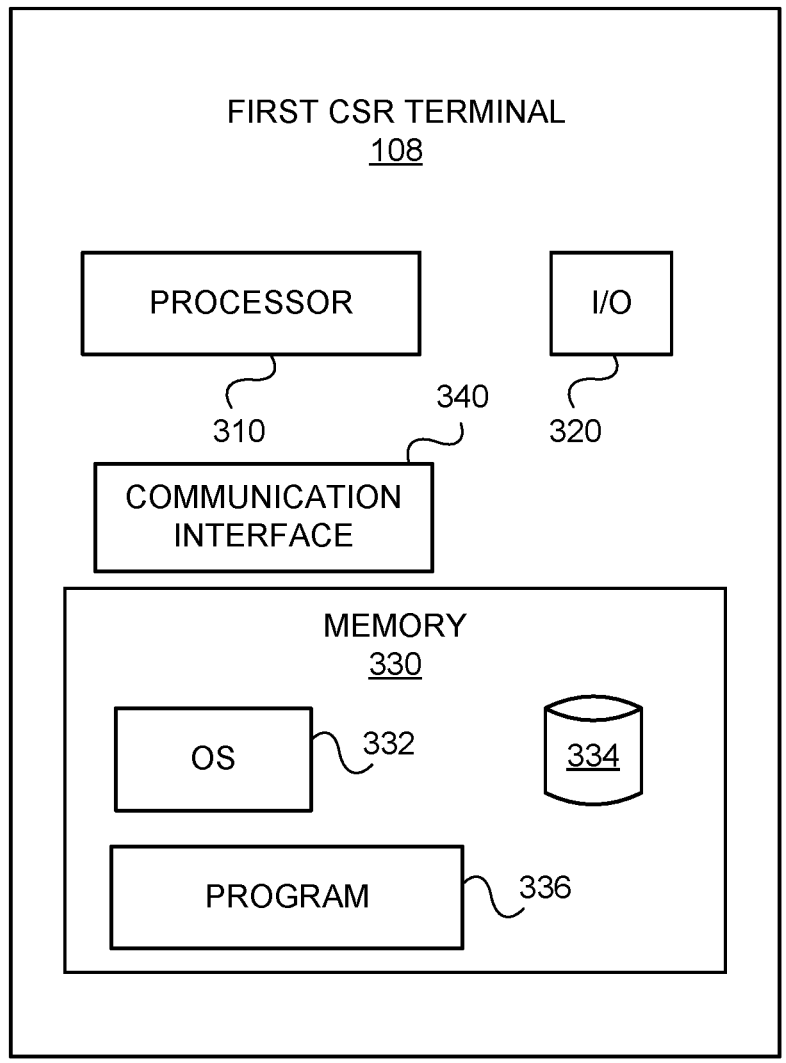
FIG. 3 is a component diagram of a first customer service representative (CSR) terminal, in accordance with some embodiments.

An example embodiment of first CSR terminal 108 is shown in more detail in FIG. 3. First CSR terminal 108 may have a similar structure and components that are similar to those described with respect to customer device 102. As shown, first CSR terminal 108 may include a processor 310; an I/O device 320; a memory 330 containing an OS 332, a storage device 334, which may be any suitable repository of data, and/or a program 336; and a communication interface 340. In some embodiments, first CSR terminal 108 may include a U/I device for receiving user input data, such as data representative of a click, a scroll, a tap, a press, or typing on an input device that can detect tactile inputs; a display; a speaker; a microphone; and/or an image capture device, such as a digital camera. In some embodiments, communication interface 340 may include a transceiver. In some embodiments, first CSR terminal 108 may further include a peripheral interface, a mobile network interface in communication with processor 310, a bus configured to facilitate communication between the various components of first CSR terminal 108, and/or a power source configured to power one or more components of first CSR terminal 108. The various components of first CSR terminal 108 may include the same or similar attributes or capabilities of the same or similar components discussed with respect to customer device 102. In some embodiments, some or all of the functionalities discussed with respect to customer device 102 may be performed or accomplished by first CSR terminal 108. For example, in some embodiments, storage device 334 may include some or all (or a copy of), or have access to, baseline communication data.

According to some embodiments, program(s) 336 may be configured to detect and/or obtain CSR baseline communication data associated with a user of first CSR terminal 108. In some embodiments, the CSR baseline communication data may include data indicative of the user conveying harassing communication. In some embodiments, the CSR baseline communication data may include data indicative of the user conveying non-harassing communication. In some embodiments, the CSR baseline communication data may include data indicative of the user being subjected to harassing communication. For example, if a customer is yelling at a CSR, the CSR may experience an elevated heartrate or other biometric indicators of stress. In some embodiments, the CSR baseline communication data may include data indicative of the user being subjected to non-harassing communication.

In some embodiments, the CSR baseline communication data may include different types of communication data, similar to the customer baseline data discussed above. For example, the CSR baseline communication data may include communication data including, but not limited to, voice data, which may include semantics data, syntax data, intonation data, volume data, stutter data, and/or non-word utterances data. In some embodiments, the communication data may comprise mannerism data, facial express data, and/or behavioral biometric data. In certain embodiments, program(s) 336 may be configured to provide a request (e.g., audibly or via a display associated with first CSR terminal 108) for a user to provide CSR baseline communication data. In some embodiments, program(s) 336 may be configured to detect that a user is communicating and may measure and/or record the communication. In some embodiments, program(s) 336 may be configured to record and/or measure only those communications approved to be recorded by the user of first CSR terminal 108. In some embodiments, program(s) 336 may be configured to record and/or measure all communications by the user of first CSR terminal 108. In some embodiments, program(s) 336 may be configured to determine that the person communicating is the user prior to recording and/or measuring communication data. In certain embodiments, program(s) 336 may be configured to record and/or measure only those communications within or related to organization 106, such as any communications with customer device 102 or second CSR terminal 116. In some embodiments, program(s) 336 may be configured to request confirmation from the user indicating whether the received communication data is indicative of harassing communication, non-harassing communication and/or whether the user is being subjected to harassing or non-harassing communication. In certain embodiments, program(s) 336 may be configured to store CSR baseline communication data locally, such as at storage device 334, or remotely, such as at communications database 114. In embodiments in which CSR baseline communication data is stored remotely, program(s) 336 may be configured to transmit received CSR baseline communication data to communications database 114 on a continuous, regular, semi-regular and/or predetermined basis. In some embodiments, program(s) 336 may be configured to transmit received CSR baseline communication data as it is received. As will be discussed more fully below, all received communication data—including data received during a conversation between a user of first CSR terminal 108 and a user of customer device 102—can be ultimately added to the CSR baseline communication data, which may improve the accuracy and/or fidelity of the CSR baseline communication data.

Memory 330 may include one or more memory devices that store data and instructions used to perform one or more features of the disclosed embodiments. Memory 330 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 330 may include software components that, when executed by processor 310, perform one or more processes consistent with the disclosed embodiments. In some embodiments, memory 330 may include a CSR baseline communication database including data enabling first CSR terminal 108 to perform one or more of the processes and functionalities associated with the disclosed embodiments. The CSR baseline communication database may include data corresponding to one or more types of communication data as discussed herein. In some embodiments, the CSR baseline communication database may include default communication data that may be representative information that is typically representative of a CSR conveying harassing communication, conveying non-harassing communication, being subjected to harassing communication, and/or being subjected to non-harassing communication. While the use of default communication data may permit first CSR terminal 108 to perform various operations and functionalities without requiring the user of first CSR terminal 108 to provide CSR baseline communication data, detections of harassing communication that are based on the default communication data may not be as accurate as detections that are based on CSR baseline communication data specific to an individual CSR as communicative tendencies and/or biological responses to stress (and its effect on an individual's communication) may vary from person to person.

Network 106 may be of any suitable type, including individual connections via the internet such as cellular or Wi-Fi networks. In some embodiments, network 106 may connect terminals, services, and mobile devices using direct connections such as RFID, NFC, Bluetooth™, BLE, Wi-Fi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a PSTN and/or a wireless network.

Organization 106 may include one or more servers, devices, and computer systems for performing one or more functions associated with products and/or services that organization 106 provides. Such servers, devices, and computer systems may include, for example, local network 110, harassment detection device 112, communications database 114, and communication server 116, as well as any other computer systems necessary to accomplish tasks associated with organization 106 or the needs of customers (which may be customers of an entity associated with organization 106).

Local network 110 may comprise any type of computer networking arrangement used to exchange data in a localized area, such as WiFi, Bluetooth™ Ethernet, and other suitable network connections that enable components of organization 106 to interact with one another and to connect to network 104 for interacting with components in system environment 100. In some embodiments, local network 110 may comprise an interface for communicating with or linking to network 104. In other embodiments, components of organization 106 may communicate via network 104 without a separate local network 110.

Harassment detection device 112 may include one or more processors and a memory device storing executable instructions that, when executed by the processor, cause the harassment detection device 112 to perform various steps for detecting harassing communication according to the technology disclosed herein. In some embodiments, harassment detection device 112 may be configured to receive communication data from customer device 102 as it is transmitted to first CSR terminal 108 and/or receive communication data from first CSR terminal 108 as it is transmitted to customer device 102. In certain embodiments, harassment detection device 112 may be configured such that it receives customer communication data from customer device 102 and transmits the customer communication data to first CSR terminal 108 and receives CSR communication data from first CSR terminal 108 and transmits the CSR communication data to customer device 102. That is, in some embodiments, harassment detection device 112 may act as a communication relay between customer device 102 and first CSR terminal 108. In certain embodiments, harassment detection device 112 may be configured to simultaneously analyze the customer communication data and/or CSR communication data as harassment detection device 112 relays the customer communication data and CSR communication data. In certain embodiments, harassment detection device 112 may analyze the customer communication data and/or CSR communication data in real-time or near real-time.

Real-time may refer to analyzation of the customer communication data and/or CSR communication data as the communication reflected by the customer communication data and/or CSR communication data is occurring. Near real-time may refer to analyzation of the customer communication data and/or CSR communication data that occurs after a small delay (on the order of microseconds to 10 seconds) with respect to the occurrence of the communication reflected by the customer communication data and/or CSR communication data.

In certain embodiments, harassment detection device 112 may be configured to record and/or store data, such as customer communication data or CSR communication data, in one or more storage locations, such as communications database 114. In some embodiments, harassment detection device 112 may be configured to record and/or store customer communication data corresponding to a plurality of customers, CSR communication data corresponding to a plurality of CSRs, and/or both. In certain embodiments, harassment detection device 112 may be configured to record and/or store customer communication data corresponding to a plurality of customers and/or CSR communication data corresponding to a plurality of CSRs simultaneously. As described herein, harassment detection device 112 may be configured to simultaneously analyze the various customer communication data and/or CSR communication data to detect harassment and/or the perception of harassment or unfairness. According to some embodiments, recorded and/or stored communication data and/or corresponding harassment analyzation of that communication data may be associated with an identifier of the corresponding customer and/or CSR. An identifier may take the form of a person's name, phone number, account number, employee identification number, username, IP address, MAC address, or the like. In some embodiments, harassment detection device 112 may be configured to track, and save data indicative of, the total number and/or frequency of conversations between a given customer and the organization associated with the CSR and/or between a particular customer and a particular CSR.

In some embodiments, harassment detection device may be configured to track, and save data indicative of, the total number and/or frequency of conversations involving a given customer and regarding a particular issue or topic. According to some embodiments, harassment detection device 112 may base harassment determinations at least in part on the total number and/or frequency of communications as described above. For example, harassment detection device 112 may be configured to become more sensitive to identifying certain communication characteristics as being indicative of harassment or potential harassment if a customer has previously harassed or been harassed by a particular CSR (or vice versa). As another example, example, harassment detection device 112 may be configured to become more sensitive to identifying certain communication characteristics as being indicative of harassment or potential harassment if a customer has previously communicated with one or more CSRs associated with an organization regarding the same or similar issue or topic. In certain embodiments, harassment detection device 112 may be configured to become increasingly sensitive to identifying certain communication characteristics as being indicative of harassment or potential harassment as the number of communications involving a particular customer and regarding a same or similar topic increases.

Certain embodiments may be configured to quantify spoken language. In some embodiments, harassment detection device 112 may be configured to detect, record, and/or analyze communicative audio (e.g., customer communication data, CSR communication data). Harassment detection device 112 may be configured to quantify spoken language. In some embodiments, harassment detection device 112 may be configured to detect and/or determine spoken language attributes associated with detected communication data. For example, harassment detection device 112 may be configured to detect one or more of semantics (e.g., meaning of one or more words), syntax (e.g., arrangement of words and/or phrases), intonation, volume (e.g., volume level, rate of change in volume), stuttering, and non-word utterance (e.g., grumbling, moaning, sighing, throat-clearing or other non-word noises created by a human).

In certain embodiments, communications database 114 may store linguistics data, and harassment detection device 112 may be enabled to compare detected communication data to stored linguistics data. In some embodiments, harassment detection device 112 may be configured to determine if detected communication data is indicative of harassing communication and/or indicative of a person perceiving that he or she is being harassed or treated unfairly based at least in part on the comparison of the detected communication data to the stored linguistics data. In some embodiments, harassment detection device 112 may be configured to determine that detected communication is indicative of harassing communication if the comparison of the detected communication and the stored linguistics data is above a predetermined threshold of similarity. For example, harassment detection device 112 may determine that an objectionable (e.g., racist, sexist) term is included in the detected communication data. In some embodiments, harassment detection device 112 may identify communication data as harassing communication upon detection of an objectionable term.

In some embodiments, harassment detection device 112 may be configured to determine that detected communication data is harassing communication if a combination of certain types of linguistic data is detected. For example, in in some embodiments, a sudden increase in volume and the presence of stuttering may be indicative of a person being angry. According to some embodiments, harassment detection device 112 may be configured to determine that detected communication data is harassing communication if data indicative of a single, certain characteristic is detected (e.g., a curse word of high severity). In some embodiments, harassment detection device 112 may be configured to determine that detected communication data is harassing if data indicative of two or more certain characteristics is detected (e.g., curse word of low severity and a rapid increase in volume). In some embodiments, harassment detection device 112 may be configured to assign weights to the various types of linguistic data, and an increased weight for a particular type of linguistic data may be indicative of an increased likelihood that detection of a characteristic corresponding to that type of linguistic data is indicative of harassing communication as compared to detection of a characteristic associated with another type of linguistic data having a comparatively lower weight. For example, in some embodiments, detection of certain words (e.g., semantics data) may be more likely to be indicative of harassing language detection of certain non-word utterances. But as another example, detection of the same non-word utterances in combination with a sudden increase in volume may be more likely to be indicative of harassing language than detection of the same certain words.

In some embodiments, harassment detection device 112 may be configured to determine that detected communication data is harassing communication if a predetermined number of types of communication data are indicative of harassing communication. In some embodiments, harassment detection device 112 may be configured to apply a binary approach wherein a given type of linguistics data associated with detected communication data is either harassing or not harassing. In some embodiments, harassment detection device 112 may be configured to determine that detected communication data is harassing communication if harassment detection device 112 determines that a single type of linguistics data is indicative of harassing communication. Some embodiments may require two, three, four, five, six, or more types of communication data to be indicative of harassing communication before harassment communication device 112 determines that the detected communication data is indicative of harassing communication.

In some embodiments, harassment detection device 112 may be configured to apply a weighted approach wherein a determination that detected communication is harassing communication is based at least in part on a weighted average of the probability of that detected linguistics data is indicative of harassing communication for two or more predetermined types of linguistics data associated with detected communication data. In some embodiments, harassment detection device 112 may be configured to determine probabilities regarding whether each type of linguistics data associated with detected communication data is indicative of harassing communication. For example, if detected communication data can comprise detected semantics data, detected syntax data, detected intonation data, detected volume, detected stuttering data, and detected non-word utterances data. Harassment detection device 112 may be configured to compare detected semantics data to stored semantics data and, based on that comparison, determine the likelihood (e.g., 10%, 50%, 85%, 100%) that the detected semantics data is indicative of harassing communication. Harassment detection device 112 may be configured to compare detected syntax data to stored syntax data and, based on that comparison, determine the likelihood that the detected syntax data is indicative of harassing communication. Harassment detection device 112 may be configured to compare detected intonation data to stored intonation data and, based on that comparison, determine the likelihood that the detected intonation data is indicative of harassing communication. Harassment detection device 112 may be configured to compare detected volume data to stored volume data and, based on that comparison, determine the likelihood that the detected volume data is indicative of harassing communication. Harassment detection device 112 may be configured to compare detected stuttering data to stored stuttering data and, based on that comparison, determine the likelihood that the detected stuttering data is indicative of harassing communication. Harassment detection device 112 may be configured to compare detected non-word utterances data to stored non-word utterances data and, based on that comparison, determine the likelihood that the detected non-word utterances data is indicative of harassing communication.

In certain embodiments, harassment detection device 112 may be manually trained to determine whether detected communication data associated with a particular person, a particular group of people (e.g., people of a particular education level; people of a particular profession or vocation; people of a particular socioeconomic status; people of a particular ethnicity; people from a certain neighborhood, zip code, city, state, region, or country; or any combination thereof), or people generally is indicative of harassing communication or a perception that a person is being harassed or treated unfairly. In certain embodiments, harassment detection device 112 may be configured to detect an accent or other identifying characteristics associated with communication data and may be configured to adjust levels of sensitivity to certain types of linguistics data based on the detected accent or other identifying characteristic. For example, harassment detection device 112 may detect a particular accent associated with a particular region and may determine, based on the region, that certain words that would otherwise be offensive or harassing are not. This is because some terms may be viewed as offensive or harassing in some regions, while those same terms may be included in the common parlance of other regions.

In some embodiments, the model employed by harassment detection device 112 may be manually trained by, for example, recording communication data and inputting a determination as to whether certain aspects or portions (e.g., a three-second portion) of the recorded communication data are indicative of harassing communication. In some embodiments, harassment detection device 112 may be configured to cross-reference all or some of communications database 114 comprising harassment detection training data to extract and/or determined predetermined thresholds corresponding to various types of linguistics data. For example, communications database 114 may comprise various portions of communication data that are indicative of harassing communication. As more specific but non-limiting examples, some portions of the stored harassing communication data may include highly harassing volume data but minimally harassing semantics data, some portions may include moderately harassing syntax data and moderately harassing non-word utterances data, and some portions may include highly harassing intonation data, minimally harassing syntax data, and minimally harassing semantics data. Various combinations of portions of the stored harassing communication data may be identified by harassment detection device 112 as harassing communication. Harassment detection device 112 may be configured to cross-reference all or some of these portions to determine a predetermined threshold for each of semantics data, syntax data, intonation data, volume data, stuttering data, non-word utterances data, etc. In some embodiments, harassment detection device 112 may be configured to apply the same or a different harassment detection model for CSRs as compared to that applied to customers.

In some embodiments, harassment detection device 112 may be configured to create an individualized harassment detection model for one or more individual CSR and/or one or more individual customer. In some embodiments, harassment detection device 112 may be configured to create an individualized harassment detection model based on accrued historical communication data associated with the corresponding individual (e.g., CSR or customer). According to certain embodiments, communications database 114 may include universal baseline data, which may be indicative of communication data that is generally indicative of a person being harassing or perceiving that he or she is being harassed or treated unfairly. Universal baseline data may be less accurate than an individualized harassment detection model, but universal baseline data may be useful when insufficient historical communication data exists for a corresponding person. In some embodiments, harassment detection device 112 may be configured to, for communications involving a particular person, compare detected communication data to universal baseline data until sufficient historical communication data for that particular person has been accrued such that harassment detection device 112 has created an individual harassment detection model for that particular person. In some embodiments, harassment detection device 112 may be configured to continuously refine the individual harassment detection model after its creation.

In some embodiments, harassment detection device 112 communication data involving a particular person and a plurality of organizations may be incorporated into the individual harassment detection model. For example, harassment detection device 112 may incorporate into the individual harassment detection model communication data between a particular customer and a CSR for a utility company, communication data between the particular customer and a CSR for a financial services provider, communication data between the particular customer and a CSR for a cell phone carrier, communication data between the particular customer and a CSR for an internet service provider, etc. This may provide for a more robust individual harassment detection model, and/or may permit harassment detection device 112 to more quickly create the individual harassment detection model corresponding to the particular customer.

Upon detection of harassing communication, harassment detection device 112 may be configured to escalate the conversation to a managing CSR (e.g., at second CSR terminal 116). Harassment detection device may be configured to transmit to second CSR terminal 116 a notification that the conversation is being escalated. In some embodiments, the notification may include one or more of analytics data, such as the likelihood that the communication data includes harassing communication, which party to the conversation is likely to be conveying harassing communication, the type of communication data that is likely to be harassing, historical data associated with the party conveying harassing communication and/or historical data associated with the party being subjected to harassing communication, or other data associated with the communication data.

In some embodiments, harassment detection device 112 may be configured to determine that the CSR associated with first CSR terminal 108 has made a promise or guarantee or other assertion that the CSR is not authorized to make, and harassment detection device 112 may be configured to transmit a notification indicating as much to second CSR terminal 116. In some embodiments, harassment detection device 112 may be configured to escalate a conversation to second CSR terminal if harassment detection device 112 determines that the customer or the CSR perceives that he or she is being harassed and/or if harassment detection device 112 determines that the customer perceives that he or she is being treated unfairly. This may permit the managing CSR at second CSR terminal 116 to intercede and resolve any potentially imminent, negative situation prior to harassing communication occurring. In certain embodiments, harassment detection device 112 may be configured to transmit a message to customer device 102, first CSR terminal 108, and/or second CSR terminal 116 requesting confirmation as to whether the conversation(s) included harassing communication, which portion of the conversation(s) included harassing communication, which types of linguistics data were indicative of the conversation(s) including harassing communication, etc. In some embodiments, harassment detection device 112 may be configured to receive a response to the request, and harassment detection device 112 may be configured to save at least a portion of the response and/or the corresponding communication data to communications database 114 as historical data associated with one or more parties to the conversation(s). As discussed herein, harassment detection device 112 may be configured to create or refine an individual harassment detection model based on this historical data. In some embodiments, harassment detection device 112 may receive confirmation as to whether the conversation(s) included harassing communication, which portion of the conversation(s) included harassing communication, which types of linguistics data were indicative of the conversation(s) including harassing communication, etc. from a third party (e.g., a party not included in the conversation(s)). For example, a conversation reviewing employee of organization 106 may review a recording of the conversation(s) and/or a transcript of the conversation(s) and may transmit confirmation(s) to harassment detection device 112.

While the above discussion focuses largely on spoken communications, the disclosed technology is equally applicable to video conferencing, textual communications, or other modes of communication. Regarding video conferencing, communication data may include facial expression data, mannerism data, gesture data, or other modes of communication that can be conveyed by video and/or audio data. Regarding textual communications, communication data may include behavioral biometric data. To more accurately determine behavioral biometric data, harassment detection device 112 may transmit, to customer device 102 and/or first CSR terminal 108, a request for identification of the type of device being used to communicate (e.g., a device identifier), and harassment detection device 112 may store the device identifier in communications database 114 and may associate the device identifier with the conversation(s) and/or the party associated with the device.

Although the preceding description describes various functions of customer device 102, first CSR terminal 108, harassment detection device 112, communications database 114, second CSR terminal 116, and communication server 118, in some embodiments, some or all of these functions may be carried out by a single computing device. For example, although FIG. 1 depicts harassment detection device 112 as being present in organization 106, in some embodiments, some or all of the functionalities of harassment detection device 112 may be carried out by first CSR terminal 108 and/or user second CSR terminal 116.

Figure 4:
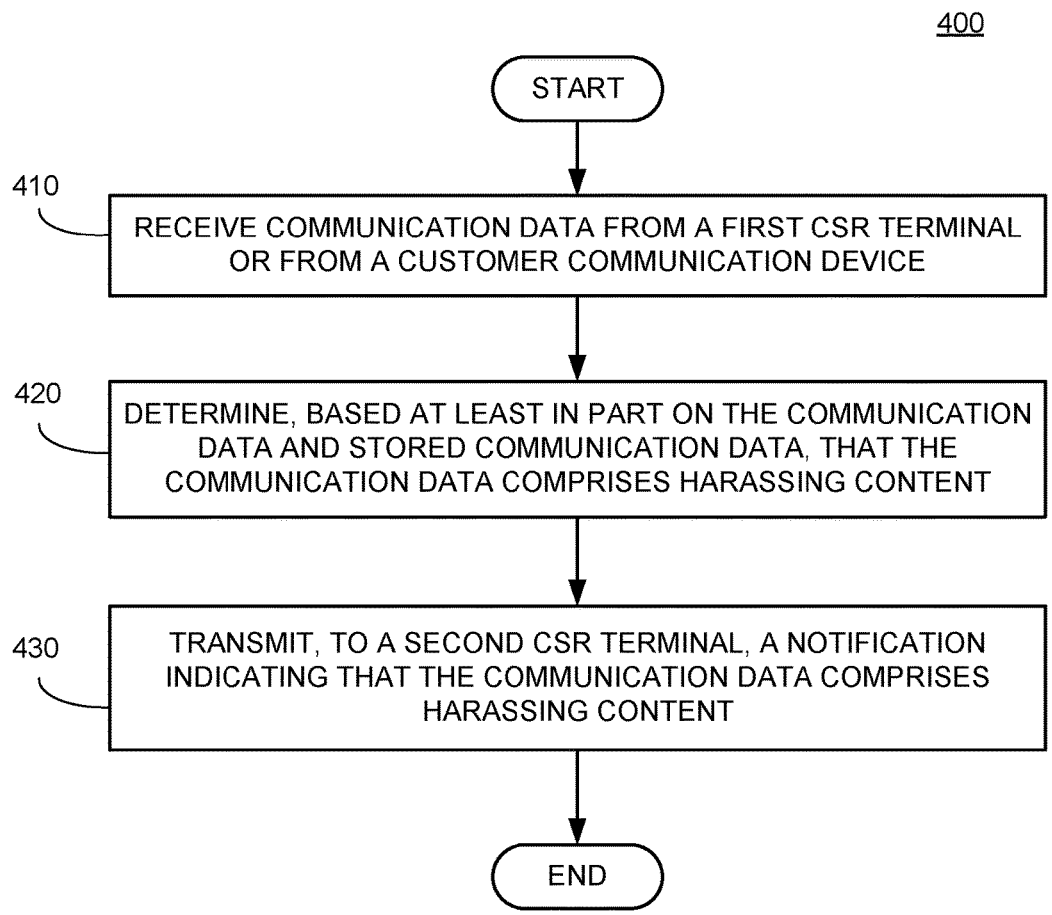
FIG. 4 is a flowchart showing operation of an example harassment detection system, in accordance with some embodiments.

FIG. 4 shows a flowchart of a method 400 for determining whether a party to a conversation is conveying harassing communication. Method 400 may be performed by some or all of customer device 102, first CSR terminal 108, harassment detection device 112, communications database 114, second CSR terminal 116, and communication server 118, or any useful combination thereof.

In block 410, method 400 may include receiving (e.g., by first CSR terminal 108, harassment detection device 112) communication data from or at first CSR terminal 108 or from customer device 102. If the conversation is a telephony conversation, the communication data will be limited to linguistics data. If the conversation is a textual conversation or a video conference, additional communications data may be present. In block 420, method 400 may include determining, based at least in part on the received communication data and stored communication data, that the voice data comprises harassing content. As described herein, determining that harassing content is present may include comparing the received communication data and the stored communication data and determining a likelihood of similarity. In block 430, method 400 may include transmitting, to second CSR terminal 116, a notification indicating that the received communication data comprises harassing content. In some embodiments, transmitting the notification may be performed automatically in response to determining that the stored communication data comprises harassing content.

Figure 5:
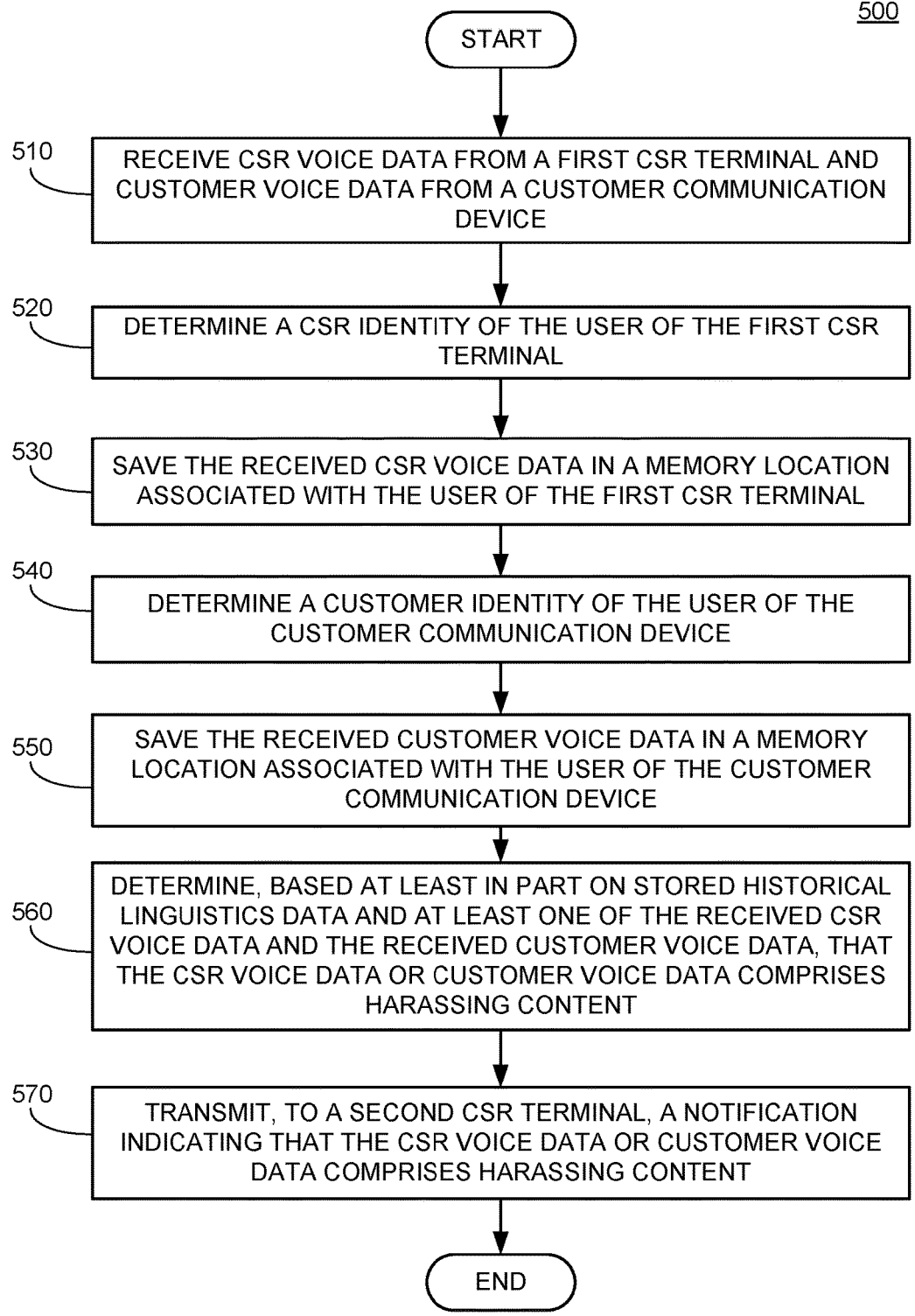
FIG. 5 is a flowchart showing operation of an example harassment detection system, in accordance with some embodiments.

FIG. 5 shows a flowchart of a method 500 for determining whether a party to a conversation is conveying harassing communication. Method 500 may be performed by some or all of customer device 102, first CSR terminal 108, harassment detection device 112, communications database 114, second CSR terminal 116, and communication server 118, or any useful combination thereof.

In block 510, method 500 may include receiving (e.g., by first CSR terminal 108, harassment detection device 112) CSR voice data from first CSR terminal 108 and customer voice data from customer device 102. In block 520, method 500 may include determining a CSR identity of the user of first CSR terminal 108. Determining the CSR identity may include recognizing voice biometrics associated with the user of first CSR terminal 108, receiving a username and password associated with the user, receiving the CSR's name, phone number, account number, employee identification number, username, IP address, MAC address, etc. In block 520, method 500 may include saving the received CSR voice data in a memory location associated with the user of first CSR terminal 108. In block 540, method 500 may include determining a customer identity of the user of customer device 102. Determining the customer identity may include recognizing voice biometrics associated with the user of customer device 102, receiving a username and password associated with the customer, receiving the customer's name, phone number, account number, username, IP address, MAC address, etc. In block 550, method 500 may include saving the received customer voice data in a memory location associated with the user of customer device 102.

In block 560, method 500 may include determining, based at least in part on stored historical linguistics data and at least one of the received CSR voice data and the received customer voice data, that the CSR voice data and/or customer voice comprises harassing content. This determination may be made in accordance with any of the approaches provided herein. In block 570, method 500 includes transmitting, to second CSR terminal 116, a notification indicating that the CSR voice data and/or customer voice comprises harassing content. In some embodiments, transmitting the notification may be performed automatically in response to determining that the CSR voice data and/or customer voice comprises harassing content.

Figure 6:
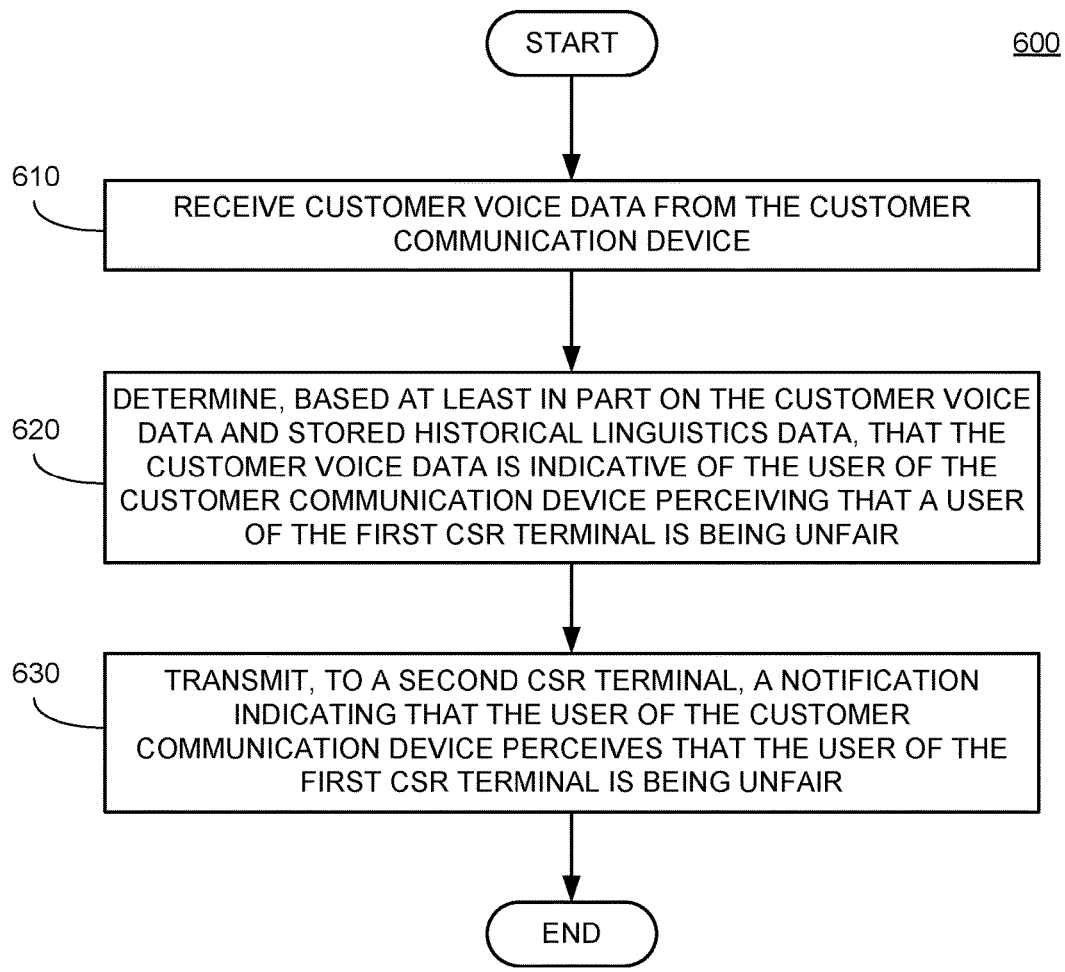
FIG. 6 is a flowchart showing operation of an example coercion detection system, in accordance with some embodiments.

FIG. 6 shows a flowchart of a method 600 for determining whether a party to a conversation is conveying harassing communication. Method 600 may be performed by some or all of customer device 102, first CSR terminal 108, harassment detection device 112, communications database 114, second CSR terminal 116, and communication server 118, or any useful combination thereof.

In block 610, method 600 may include receiving (e.g., by first CSR terminal 108, harassment detection device 112) customer voice data from customer device 102. In block 620, method 600 may include determining, based at least in part on the customer voice data and stored historical linguistics data, that the customer voice data is indicative of the user of customer device 102 perceiving that a user of first CSR terminal 108 is being unfair or is conveying harassing content. This determination may be made in accordance with any of the approaches provided herein. In block 630, method 600 may include transmitting, to second CSR terminal 116, a notification indicating that the user of customer device 102 perceives that the user of first CSR terminal 108 is being unfair or is conveying harassing content. In some embodiments, transmitting the notification may be performed automatically in response to determining that the CSR voice data and/or customer voice comprises harassing content.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. When a customer converses or otherwise communicates with a CSR, it is not uncommon for one or more of the parties to become frustrated or upset. To facilitate a good customer experience and to prevent the CSR from being subjected to large amounts of harassment from customers, the system may facilitate the automatic introduction of a managing CSR to the conversation or transfer the customer to the managing CSR such that the managing CSR is enabled to resolve any negative situation that has arisen.

A customer can contact a customer service provider via a telephone or computer (e.g., customer device 102), and the CSR can use a telephone or a computer (e.g., first CSR terminal 108) to communicate with the customer. This conversation can be monitored by a monitoring device (e.g., harassment detection device 112). The monitoring device can be configured to detect harassing communication, offensive communication, threatening communication, or other types of undesired communication. The monitoring device can access historical records indicative of harassing communication (e.g., data stored in communications database 114). The historical records can include data that is generally indicative of harassing communication, or the historical records can include data that is personalized. For example, the historical records may include historical customer communication data that is specific to a particular customer, and/or the historical records may include historical CSR communication data that is specific to a particular CSR. The historical records can include various types of communication data, which can include at least one or more of semantics data, syntax data, intonation data, volume data, stuttering data, non-word utterances data.

The monitoring device can monitor the conversation between the customer and the CSR, and the monitoring device can compare data indicative of the customer's communications to the historical data (e.g., historical customer communication data) and/or compare data indicative of the CSR's communications to the historical data (e.g., historical customer communication data). Upon determining that the customer's communications and/or the CSR's communications are sufficiently similar to historical data indicative of harassing communication, the monitoring device can determine that the customer and/or CSR is engaging in harassing communication. The monitoring device can be configured to use one or more methods to determine whether the customer's communications and/or the CSR's communications is sufficiently similar to historical data indicative of harassing communication, as discussed herein. Alternately or in addition, the monitoring device can be configured to determine whether the customer perceives that he or she is being treated unfairly, discriminated against, or deceived by comparing the customer's communication data and/or the CSR's communications to historical data.

Responsive to determining that the customer and/or the CSR has engaged in harassing communication, the monitoring device can notify a second CSR, such as a CSM, that the conversation between the customer and the CSR involves harassing communication and/or that the customer perceives that he or she is being treated unfairly. The notification can be transmitted to a telephone or computer (e.g., second CSR terminal 116) accessible by the CSM. The notification can include information regarding the conversation between the customer and the CSR, information regarding the likelihood and/or type of harassing content detected by the monitoring device, information relating to historical harassing communications involving the customer and/or the CSR, or any other pertinent information. The monitoring device can transfer the customer's device (e.g., customer device 102) from the CSR's device (e.g., first CSR terminal 108) to the CSM's device (e.g., second CSR terminal 116). Alternately, the monitoring device can add the CSM's device to the conversation between the customer's device and the CSR's device.

During or following the conversation, the monitoring device can transmit, to the customer, the CSR, and/or the CSM, a request for confirmation regarding the detected harassing communication. This request can include a request a request for confirmation that the detected harassing communication indeed included harassing content or for confirmation of other pertinent information such as the type of harassing content and/or the severity of the harassing content. The system can then save this information in a memory location associated with the customer or the CSR such that this information can be used as historical communication data for future communications including the customer or the CSR.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

We claim:

1. A system for harassment detection comprising:
one or more processors; and
a memory coupled to the one or more processors and storing instructions that, when executed by the one or more processors, cause the one or processors to:
receive voice data from at least one of a first customer service representative (CSR) terminal and a customer communication device, the voice data comprising data corresponding to spoken communication from a user of the first CSR terminal during an electronically facilitated conversation or a user of the customer communication device during the electronically facilitated conversation;
determine, based at least in part on the voice data and at least one of stored semantics data, stored syntax data, stored intonation data, stored volume data, and stored non-word utterances data, that the voice data comprises harassing content by:
deriving, from the voice data, at least three of derived semantics data, derived syntax data, derived intonation data, derived volume data, and derived non-word utterances data;
determining, based on a predetermined list of harassment factors, one or more harassment scores for the at least three of the derived semantics data, derived syntax data, derived intonation data, derived volume data, and derived non-word utterances data;
determining, at predetermined intervals during the electronically facilitated conversation, a conversation harassment score by:
determining a level of similarity for each of the at least three of the derived semantics data, derived syntax data, derived intonation data, derived volume data, and derived non-word utterances data based on respective comparisons of at least three of the derived semantics data, derived syntax data, derived intonation data, derived volume data, and derived non-word utterances data to the stored semantics data, stored syntax data, stored intonation data, stored volume data, and stored non-word utterances data; and determining that the level of similarity for each of the at least three the derived semantics data, derived syntax data, derived intonation data, derived volume data, and derived non-word utterances data exceeds a predetermined similarity threshold; and determining that the conversation harassment score is above a predetermined harassment threshold; and responsive to determining that the voice data comprises harassing content based on the conversation harassment score being above the predetermined threshold, transmit, to a second CSR terminal, a notification indicating that the voice data comprises harassing content.

2. The system of claim 1, wherein determining that the voice data comprises harassing content further comprises:

determining baseline voice data from the voice data or from stored voice data associated with the user of the first CSR terminal or the customer communication device, the baseline voice data being indicative of linguistic data representative of the user of the first CSR terminal or the customer communication device communicating in a non-harassing manner;

determining a level of similarity based on a comparison of the voice data and the baseline voice data; and determining that the level of similarity exceeds a predetermined threshold.

3. The system of claim 2, wherein the baseline voice data comprises at least one of baseline semantics data, baseline syntax data, baseline intonation data, baseline volume data, and baseline non-word utterances data, and determining that the voice data comprises harassing content comprises:

determining a level of similarity based on a comparison of the at least one of baseline semantics data, baseline syntax data, baseline intonation data, baseline volume data, and baseline non-word utterances data to the corresponding derived semantics data, derived syntax data, derived intonation data, derived volume data, and derived non-word utterances data; and determining that the level of similarity is below a predetermined threshold.

4. The system of claim 1, wherein the instructions, when executed by the one or more processors, further cause the one or more processors to:

determine an identity of the user of the first CSR terminal or the customer communication device; and associate the identity with stored baseline voice data, the stored baseline voice data being indicative of linguistic data (i) received in a previous spoken communication and (ii) representative of the user of the first CSR terminal or the customer communication device being non-harassing;

wherein determining that the voice data comprises harassing content comprises:

determining a level of similarity based on a comparison of the voice data and the stored baseline voice data; and determining that the level of similarity is below a predetermined threshold.

5. The system of claim 4, wherein determining the identity of the user of the first CSR terminal or the customer communication device comprises determining a telephone number or an IP address associated with at least one of the CSR terminal or the customer communication device.

6. The system of claim 4, wherein determining the identity of the user of the first CSR terminal or the customer communication device comprises identifying, based at least in part on received voice data and saved voice identification data, a voice of the user of the first CSR terminal or the customer communication device, the voice identification data being associated with the user of the first CSR terminal or the customer communication device.

7. A system for harassment detection comprising:

one or more processors; and a memory coupled to the one or more processors and storing instructions that, when executed by the one or more processors, cause the one or more processors to:

receive customer service representative (CSR) voice data from a first CSR terminal and customer voice data from a customer communication device, the CSR voice data comprising data corresponding to spoken communication from a user of the first CSR terminal during an electronically facilitated conversation and the customer voice data comprising data corresponding to spoken communication from a user of the customer communication device during the electronically facilitated conversation;

determine, based at least in part on a comparison of stored historical linguistics data to at least one of the received CSR voice data and the received customer voice data, that the CSR voice data or customer voice data comprises harassing content;

transmit, to a second CSR terminal, a notification indicating that the CSR voice data or customer voice data comprises harassing content determine, based at least in part on at least one of the received CSR voice data and the received customer voice data, a communication topic associated with the spoken communication;

determine, based at least in part on the stored historical linguistics data and at least one of the received CSR voice data and the received customer voice data, a likelihood that the user of the first CSR terminal or the user of the customer communication device will communicate harassing content, wherein determining the likelihood that the user of the first CSR terminal or the user of the customer communication device will communicate harassing content comprises determining that a number of previous electronically facilitated conversations associated with the user of the customer communication device and the communication topic exceeds a predetermined threshold; and responsive to determining that the likelihood that the user of the first CSR terminal or the user of the customer communication device will communicate harassing content is above a predetermined threshold, transmit an imminent harassment notification to the user of the second CSR terminal.

8. The system of claim 7, wherein the instructions, when executed by the one or more processors, further cause the one or more processors to, if the CSR voice data comprises harassing content, save, to a memory location associated with the user of the first CSR terminal, an indication that the CSR voice data comprises harassing content.

9. The system of claim 7, wherein the instructions, when executed by the one or more processors, further cause the one or more processors to, if the customer voice data comprises harassing content, save, to a memory location associated with the user of the customer communication device, an indication that the customer voice data comprises harassing content.

10. The system of claim 7, wherein the instructions, when executed by the one or more processors, further cause the one or more processors to, responsive to determining that the CSR voice data or customer voice data comprises harassing content, add the user of the second CSR terminal to the electronically facilitated conversation.

* * * * *